United States Patent [19]

Cox

[11] 4,362,748

[45] Dec. 7, 1982

[54] METHOD FOR FORMING SHAPED PRODUCTS FOR HUMAN AND/OR ANIMAL CONSUMPTION OR AS MARINE BAIT AND PRODUCTS PRODUCED THEREBY

[75] Inventor: James P. Cox, Lynden, Wash.

[73] Assignees: Loyal Wells, Thiensville, Wis.; Cox Family Laboratories, Inc., ; a part interest

[21] Appl. No.: 193,434

[22] Filed: Oct. 3, 1980

[51] Int. Cl.$^3$ .......................... A23L 1/04; A23K 1/18
[52] U.S. Cl. .......................................... 426/1; 426/89; 426/104; 426/276; 426/575; 426/512; 426/516; 426/803; 426/806
[58] Field of Search .................. 426/1, 102, 13, 104, 426/276, 575, 803, 89, 512, 330, 335, 806, 516

[56] References Cited

U.S. PATENT DOCUMENTS

| 3,362,831 | 1/1968 | Szczesniak | 426/575 X |
| 3,421,899 | 1/1969 | Humphreys | 426/1 |
| 3,682,654 | 8/1972 | Johnson | 426/335 X |
| 3,876,803 | 4/1975 | Stephan et al. | 426/1 |
| 3,892,870 | 7/1975 | Wood | 426/575 X |
| 4,119,739 | 10/1978 | Barwick et al. | 426/575 X |

FOREIGN PATENT DOCUMENTS 708992  5/1954  United Kingdom ............... 426/803

*Primary Examiner*—Robert A. Yoncoskie

*Attorney, Agent, or Firm*—Hughes, Barnard & Cassidy

[57] ABSTRACT

Methods for forming simulated, shaped, edible products suitable for human and/or animal consumption, or as a bait for marine creatures; and simulated, edible products produced thereby. More particularly, improved processes of the foregoing character wherein an aqueous alginate solution containing one of a sterilant or a sterilant neutralizer, with or without other additives such, for example, as comminuted food products, offal, coloring materials, flavorings, attractants and/or species specific repellants or irritants for marine creatures, are mixed into an essentially homogeneous viscous solution with the viscous solution thus formed being introduced in a desired shaped configuration into a setting bath containing a metallic salt in aqueous solution wherein the setting bath includes the other of the sterilant or sterilant neutralizer, so as to: (i) substantially instantaneously "set" the shaped viscous solution upon contact with the setting bath in the shaped configuration in which it is introduced; (ii) sterilize the ingredients comprising the product thus formed; and (iii), neutralize the sterilant so as to permit the intended use of the product without danger of harm or irritation from hazardous residues; yet, wherein the product thus formed can be readily made indistinguishable from the real or natural product that it simulates in terms of appearance, texture, bite, taste, feel, olfactory and/or gustatory characteristics, and other sensory characteristics.

38 Claims, 14 Drawing Figures

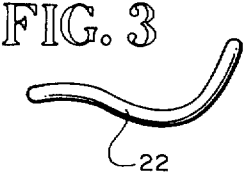
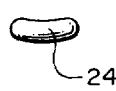
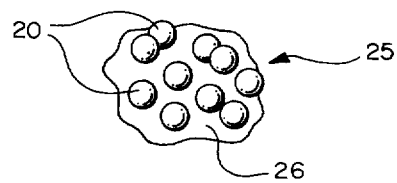
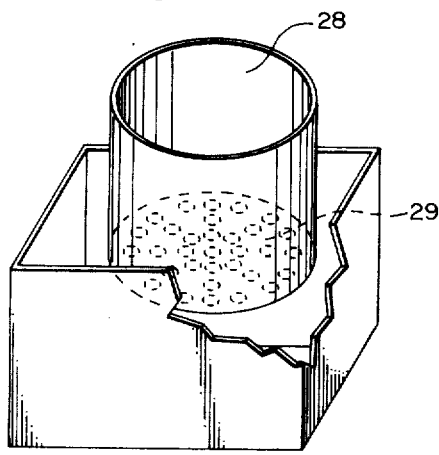
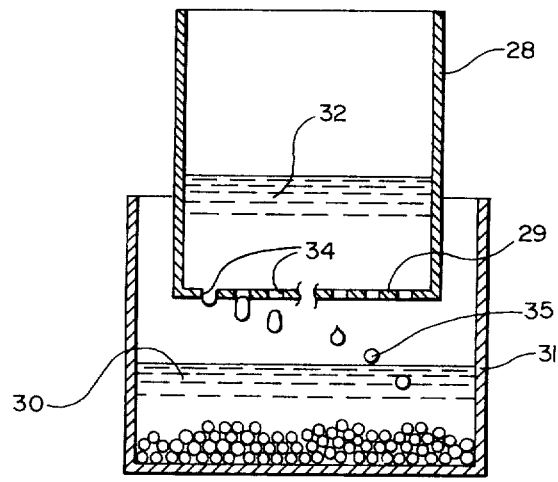
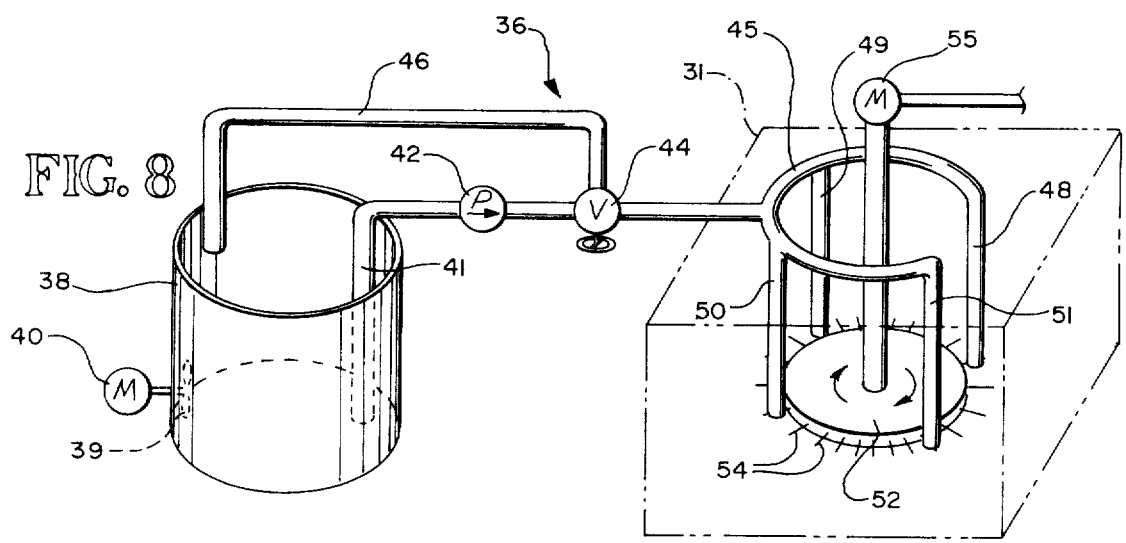

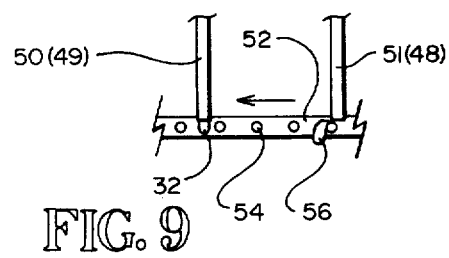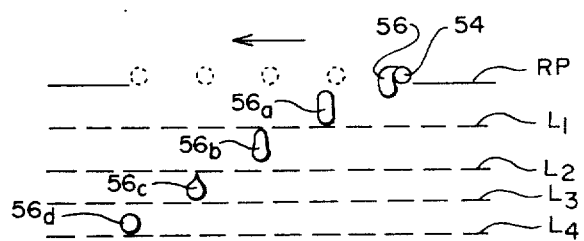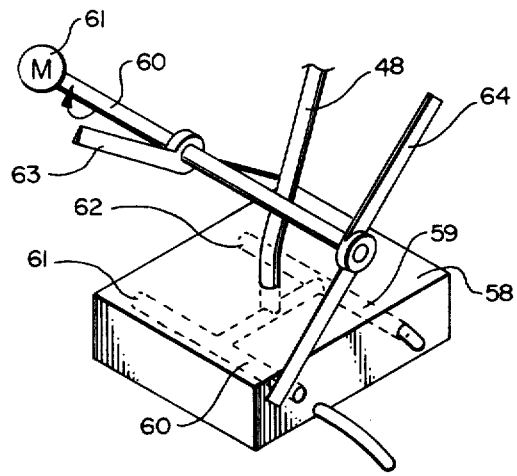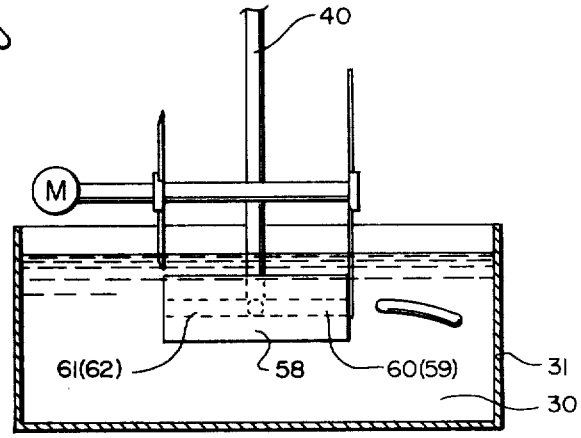

4,362,748

METHOD FOR FORMING SHAPED PRODUCTS FOR HUMAN AND/OR ANIMAL CONSUMPTION OR AS MARINE BAIT AND PRODUCTS PRODUCED THEREBY

BACKGROUND OF THE INVENTION

The present invention relates in general to simulated artificial edible products which are suitable for animal and/or human consumption, or which can be used as baits for marine creatures; and, more particularly, to improved methods for forming such simulated edible products rapidly on a mass production basis with the products produced having a desired configuration or shape, yet wherein the simulated product can be effectively and rapidly sterilized during the forming process while leaving no hazardous residue so as to prevent bacteriological degradation of the product and, particularly, of organic food stuffs contained therein; and, wherein the resulting product is substantially indistinguishable from the real or natural product it is intended to simulate in terms of appearance, texture, bite, taste, feel, olfactory and/or gustatory characteristics, and other sensory characteristics.

A. Introduction

Various techniques have long been known for forming synthetic or simulated products from organic and/or chemical materials wherein the simulated product formed is suitable for consumption as an edible product by human and/or domestic animals, or suitable for use as a fish bait or the like. Generally, however, the methods and apparatus for formulating such products have been relatively complex, and have often required sophisticated process controls in order to produce a commercially acceptable product. As a general rule, the processes heretofore suggested have required significant energy consumption in order to heat the ingredients involved to desired reaction temperatures and, subsequently, to cool or chill the materials during curing or setting thereof. Moreover, the products produced, if they are to simulate an irregularly shaped real or natural object, generally require separate molding steps. Additionally, when intended for usage as an edible product, some provision must be made for insuring that those constituents of the product subject to bacteriological attack are effectively sterilized; yet, wherein no hazardous residues are retained which affect the taste and/or quality of the product.

B. Prior Art Statement

The prior art appears to be replete with many proposals for processes and/or apparatus for forming fish baits—generally employing a heat settable plastisol composition including polyvinyl chloride or the like and a suitable plasticizer, and fish baits formed therewith; as well as with patents directed to compositions and processes for forming gelatinous products. However, prior to the advent of the present invention, there has been no known method or apparatus for forming fish baits having a variety of desired shapes in a process wherein an aqueous alginate solution is introduced into an aqueous calcium bath, preferably containing a small quantity of calcium chloride—e.g., on the order of less than 2.0% calcium chloride and preferably, on the order of from about 0.1% to 0.2% calcium chloride—so as to cause the discrete quantity of the aqueous alginate solution to set substantially instantaneously in the desired shape or configuration.

For example, Fitzsimons U.S. Pat. No. 2,979,778 and Humphreys U.S. Pat. No. 3,421,899 each discloses systems wherein an artificial bait is formed from a mixture of polyvinyl chloride and a plasticizer, together with suitable optional additives, which are then placed into molds and heat-set to form the resultant product. In the Humphreys patent, the patentee illustrates and describes plastic salmon eggs which are spheroid in shape. Hardin U.S. Pat. No. 3,854,234 discloses a similar arrangement wherein an edible core or filler formed of cheeses, animal by-products, cereal grains and suitable preservatives is first molded to form a desired size and shape, and is thereafter enclosed in snug-fitting plastisol jacket. Inoue U.S. Pat. No. 3,875,302 discloses an arrangement for forming gelled polyvinyl alcohol polymers by first freezing an aqueous solution and thereafter melting the frozen solution to form artificial bait.

Stephan et al U.S. Pat. No. 3,876,803 discloses a method for forming a simulated fish bait by mixing a gel-forming proteinaceous material and water at an elevated temperature, with the material then being formed into the desired shape, cooling the shaped mass, and then treating the surface of the shaped mass with a tanning agent such as formaldehyde to form a relatively insoluble skin surrounding what is purported to be a relatively soluble gel structure. Ernstrom U.S. Pat. Nos. 3,607,294, Combs 3,684,519 and Popeil 3,931,414 disclose various types of specific fish bait compositions and methods of forming the same, although such patent disclosures are only of general interest.

Humphreys U.S. Pat. No. 3,437,488 discloses a method and apparatus for the formation of fish bait wherein a mixture of gelatin, glycerine, water and a curing agent is first formed and heated, and is thereafter transferred to metering tanks where the mixture is maintained at a temperature on the order of 160° F. The thus heated mixture is then dropped in globules into a chilled bath of mineral and/or vegetable oils maintained generally at 30°–32° F. As the globules move through the chilled oil, they tend to assume a spherical shape as they set. Orn U.S. Pat. No. 3,579,895 discloses a similar system for forming either spherical simulated fish eggs or clusters thereof from a plastisol such as polyvinyl chloride which is first heated to relatively high temperatures on the order of 300° to 330° F. with the heated mixture then being dropped into a glycerine bath, the characteristics of which are determinative of whether the resultant artificial fish bait is formed in clusters or in the shape of individual spherical eggs.

Many prior art patents can be found which relate in general to the formation of gelatinous food products by the interaction of alginates with various metal salts and, particularly, with salts of calcium such as calcium carbonate. Typical of these patents are Steiner U.S. Pat. Nos. 2,441,729, Gibsen 2,918,375, Freedman 3,349,079 and Miller et al 3,455,701. In general, these patents disclose relatively slow gelation processes which generally require on the order of 10 minutes for the calcium solution to cause the alginate to form a soft gel. A similar disclosure appears in an article authored by T. R. Andrew and W. C. MacLeod, *Application and Control of the Algin-Calcium Reaction*, FOOD PRODUCT DEVELOPMENT, August-September, 1970, at pages 99, 101, 102 and 104. In this article the authors discuss the formation of various types of artificial food products using a sodium alginate solution which can be slowly gelled by dispersion in an aqueous calcium salt solution or which can be instantaneously gelled by dispersion into a 10% solution of calcium chloride. It is stated that a mixture of an algin syrup with sugar, colorings, flavors, etc., can be deposited in a calcium chloride bath " . . . to form spheres which look like fruit or vegetable pieces . . . " or " . . . caviar . . . " (page 104).

In Peschardt U.S. Pat. No. 2,403,547, the patentee proposes forming a viscous solution comprising 100 parts by weight of water, 20 parts by weight of glucose, and sodium alginate comprising from 1% to 2% by weight of the final solution, to which any desired optional colorings or flavorings may be added. To make spheroidal-shaped objects such as "cherries", the patentee proposes extrusion of the foregoing basic stock as "detached blobs" from extrusion nozzles into an aqueous solution of calcium chloride specifically stated to range from " . . . as little as 1% or 3% or as much as 10% or more calcium chloride in the setting bath . . . ". (Col. 2, lines 44–46). Peschardt further suggests that shapes and forms other than spheroidal can be obtained by charging the basic alginate stock into mold recesses, and then depositing the pre-molded shapes of viscous stock into the setting bath.

Other patents of miscellaneous interest pertaining to alginate based compositions and processes for making food products and the like include U.S. Pat. Nos.: 2,809,893-Poarch et al; 2,965,498-Hartwig et al; 2,973,274-Langmaack; 3,060,032-Glicksman; 3,362,831-Szezesniak; and, 3,650,766-Smadar.

In general, it has been found that despite the efforts of a large number of researchers over a prolonged period of time (as exemplified by the foregoing publication and patents), prior to the advent of the present invention no simple, economical system had been developed for forming simulated or artificial edible products suitable for consumption by humans or animals, or suitable for use as fish baits. That is, when employing plastisol type materials as the base stock—e.g., in the fashion suggested by the aforesaid Humphreys, Fitzsimons, Hardin, Inoue and/or Orn patents—it has been found necessary to employ expensive and critical process controls and equipment. For example, it has generally been necessary to provide separate steps in the process operation wherein the base stock is first heated to a temperature range within relatively precisely controlled limits, with the stock thereafter being cooled or chilled—in some cases, by freezing—in order to cure or set the plastisol gel. Such processes are extremely wasteful in terms of energy consumption, require careful human controls and involve extensive training for system operators, and, additionally, present significant dangers and hazards to operators, particularly when using hot liquid baths and the like. If it is desired to form products having particular configurations other than spheroid and, in some cases including spheroid, it is necessary to utilize intermediate molding steps which require additional complex and expensive equipment, as well as additional process time and expense. Moreover, the resulting products, whether spheroid or of other configurations, are generally not edible in terms of human and/or animal consumption; and, while they have been used as fish baits, their characteristics in terms of texture, bite, and feel are such as to render them unsuitable for attracting many desirable species of marine animals.

Those of the aforesaid publication and/or patents relating to the formation of food products using an alginate base stock have, on the other hand, been found to be generally satisfactory for forming edible products suitable, within limits, for animal and/or human consumption. That is, while such known prior art processes contemplate the use of comminuted organic food products which are suspended in the aqueous alginate solution, they have generally failed to recognize the need for effectively sterilizing the organic material to prevent bacteriological degradation thereof; or, where sterilization has been provided, they have failed to recognize the need and/or desirability of neutralizing the sterilant. Thus, whereas the aforesaid Stephan et al patent does suggest the use of a tanning agent such as formaldehyde—a well-known sterilizing agent—to cure the fish bait being formed, the patentees do not recognize the desirability of neutralizing the formaldehyde. Consequently, the resulting product is suitable for use in a relatively limited environment—viz., as a fish bait— —and will have some undesirable characteristics in terms of overall texture since the formaldehyde will tend to gradually saturate the object and progressively harden it throughout. It should be noted that J. C. Prats has proposed the use of a sterilant such as sodium metabisulfite for use in alginate-based pet foods having, as a constituent ingredient thereof, comminuted meat or fish products. However, no provision has been made for neutralizing the sulphur dioxide produced during the reaction process—a phenomenon which results in generation of noxious fumes that are both hazardous and objectionable to humans and/or animals. See, e.g., J. C. Prats, *The Alginates in the Manufacture of Feeds for Domestic Animals,* AFINIDAD (Spain), No. 351, November 1977, Vol. XXXIV, Pages 651–654.

While several of the aforesaid references involving alginate-based stock solutions suggest the use of sugar, sucrose, glucose and similar sweeteners in the aqueous alginate solution or base stock, they have failed to recognize that when the solution is subsequently introduced into, for example, a calcium chloride bath, such materials tend to gravitate by osmosis out of the gelled base materials and are, therefore, to a significant extent lost or wasted with the used chloride bath when the latter is discarded. Moreover, references such as the aforesaid Andrew et al article (which proposes utilizing setting solutions containing 10% calcium chloride), or the Peschardt patent (which proposes using " . . . as little as 1% or 3% or as much as 10% or more calcium chloride in the setting bath . . . )," have failed to recognize that such heavy concentrations of calcium chloride, while serving to promote rapid setting of the alginate gel, tend to render the finished product both bitter and brittle, thereby causing such products to be unattractive and unappetizing as either an edible animal or human product or as a fish bait.

Those persons skilled in the art pertaining to fisheries and acceptable baits for use in different types of fishing operations, will recognize that for many years one bait that has been found to be particularly desirable and successful—at least in the view of many fishermen engaged in certain species specific fishing operations has been maggots. Unfortunately, however, maggots have, for all practical purposes, been legislated out of existence by Governmental action which has served to effectively close down maggot producing operations. Prior to the advent of the present invention, there has been no known simulated or artificial maggot available to replace natural maggots; nor have any processes or equipment been disclosed for producing such simulated maggots. Consequently, this particularly successful and desirable bait has been eliminated from the fishermens' inventory of available baits.

SUMMARY OF THE INVENTION

Accordingly, it is a general aim of the present invention to provide improved processes for overcoming all of the foregoing disadvantages inherent in the prior art and which have continued to plague those industries involved in formulating artificial and simulated edible products; while, at the same time, producing finished products that can be readily shaped in desired configurations without the need for molding and/or which are characterized by their physical and chemical appearance in terms of taste, texture, bite, olfactory and/or gustatory characteristics, and other sensory characteristics, such that the resulting product is virtually indistinguishable from the real product to the consumer—irrespective of whether the consumer is human, animal, or marine in nature.

In another of its important aspects, it is an object of the invention to provide improved processes for preserving the fresh, natural appearance of artificial simulated food products suitable for marine, animal and/or human consumption.

A more detailed object of the invention is to provide improved processes for insuring retention of the natural characteristics of comminuted food stuffs suspended in a gelatinous matrix. In this connection, it is an object of the invention to provide convenient, inexpensive and effective means for sterilizing food stuffs—yet which, at the same time, are characterized by their low cost and simplicity. As a result of attaining these and the foregoing objectives, significant savings in packaging costs, energy consumption, and energy costs can be realized; yet, hazardous residues are effectively eliminated from the product produced, thereby rendering the latter completely safe for consumption.

In another more detailed aspect of the invention, it is an object to provide processes suitable for forming shaped products having a gelled algin matrix wherein the constituent ingredients of the product can be thoroughly and effectively sterilized, with the sterilant thereafter being neutralized by the use of a single metallic salt which serves both to produce gelling of the algin matrix and, at the same time, to neutralize the sterilant additives.

A further detailed objective of the invention is the provision of improved methods for forming artificial baits such as fish eggs, worms, maggots and clusters which are substantially indistinguishable from real natural baits.

In another and more detailed objective of the invention, provision is made for forming artificial baits wherein a sterilant neutralizer is employed in the aqueous alginate solution; and, a sterilant, such as formaldehyde, is employed in the setting solution so as to form a finished bait characterized by its tough hardened exterior skin which is particularly suitable for permitting effective engagement of fish hooks therein; yet, wherein the interior portions of the bait are maintained soft and with a natural gelatinous texture as a result of neutralization of the sterilant by the neutralizing agent.

When used as fish baits, it is an object of the invention to provide processes which readily permit the use of fish attractants uniformly dispersed throughout the artificial bait, yet wherein the fish attractant employed is permitted to osmotically migrate from the solidified alginate matrix which acts as a controlled release retardant to permit gradual "milking" of the fish attractants when the bait is in use. At the same time, where desired, trace amounts of selected species specific marine animal repellants and/or irritants can optionally be included in the artificial bait which, upon "milking" tend to be aversive to those particular marine predators of the species of marine creature the fisherman is attempting to catch. For example, octopus are a natural predator of crabs; but, since octopus find copper sulfate to be an irritant, it has been found that the inclusion of trace amounts of copper sulfate tends to repel the predator while not repelling crabs.

DESCRIPTION OF THE DRAWINGS

These and other objects and advantages of the present invention will become more readily apparent upon reading the following detailed description and upon reference to the attached drawings, in which:

FIG. 1 is an elevational view of a typical artifical salmon egg or the like formed in accordance with the present invention;

FIG. 2 is a view similar to FIG. 1, but here illustrating a simulated or artificial fish egg formed in accordance with the present invention and having a tear-drop shaped configuration similar to a spherical egg having a tail thereon, and capable of promoting non-linear movement of the egg when used as a bait in a relatively moving water environment;

FIGS. 3 and 4 are views similar to FIGS. 1 and 2, but here respectively illustrating worms and maggots formed in accordance with the present invention;

FIG. 5 is a view similar to FIGS. 1 through 4, but here illustrating an artificial bait product comprising a cluster of eggs of the type shown in FIG. 1 supported in a transluscent or somewhat transparent solidified gel matrix;

FIG. 6 is a diagrammatic perspective view of relatively rudimentary equipment which is, despite its simplicity, extremely effective for mass producing relatively small diameter spherical or slightly tear-drop shaped simulated fish eggs—eggs which are particularly suitable for incorporation in cluster-type bait of the type shown in FIG. 5;

FIG. 7 is a vertical sectional view of the apparatus shown in FIG. 6, here depicting the formation of artificial fish eggs and the relative change that takes place in the shaped configuration of the aqueous alginate solution as the latter is dropped or dripped into a calcium chloride setting bath;

FIG. 8 is a perspective diagrammatic view illustrating one exemplary type of automated system which is particularly suitable for forming artificial or simulated fish eggs of the types shown in FIGS. 1 or 2 on a mass production basis;

FIG. 9 is an enlarged, fragmentary, side-elevational view here depicting the formation of discrete globules of a viscous alginate solution when using the exemplary equipment of the type shown in FIG. 8;

FIG. 10 is a diagrammatic view illustrating the progressive change in shape or configuration of the discrete globule formed in FIG. 9 as the globule drops towards the setting bath and, illustrating also, how the actual shape or configuration of the simulated product can be controlled by merely adjusting the distance between the drop forming apparatus and the surface of the setting bath;

FIG. 11 is a fragmentary perspective view of an exemplary apparatus that has been found to be particularly suitable for forming worms and/or maggots of the type respectively illustrated in FIGS. 3 and 4;

FIG. 12 is a fragmentary side-elevational view of the apparatus shown in FIG. 11, here depicting how such apparatus can be used in actual operation to form desired products;

Figure 13:
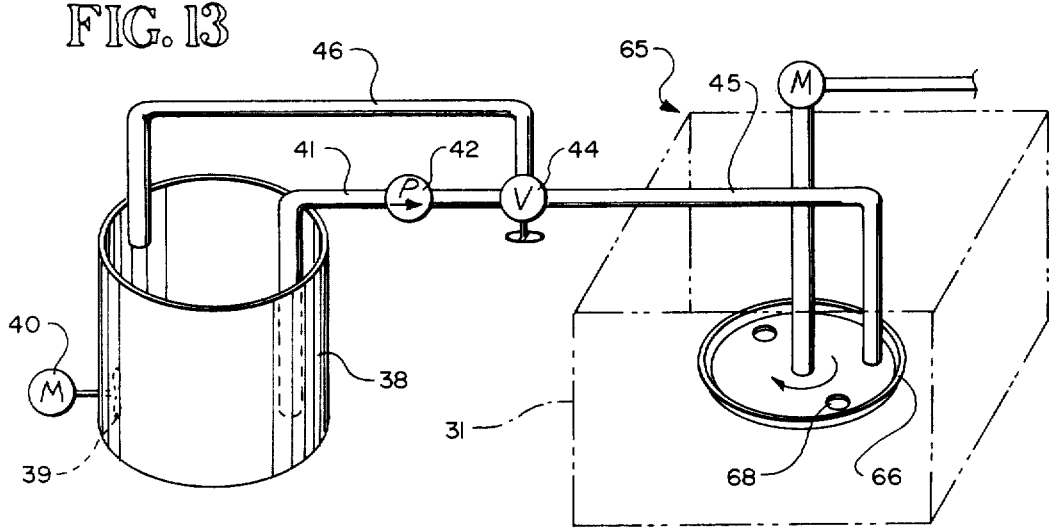
FIG. 13 is a perspective diagrammatic view similar to FIG. 8, but here illustrating one exemplary type of apparatus that can be utilized to form clusters of eggs of the type shown in FIG. 5; and, FIG. 14 is a fragmentary, vertical, sectional view here depicting the formation of egg clusters when using equipment of the type shown in FIG. 13.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION

Turning first to FIGS. 1 through 5, there have been illustrated a series of simulated artificial products made in accordance with the present invention. As the ensuing description proceeds, those skilled in the art will appreciate that the particular products shown can, and will, vary in shape, size and other physical and/or chemical characteristics dependent upon such factors as, for example, the characteristics of the natural product being simulated and the end usage to which the simulated product is to be put. While the present invention is, in its broadest aspects, equally applicable to the formation of synthetic artificial foods intended for human consumption, pet foods, fodder for domestic animals, fertilizers, and the like, it has been found to have particularly advantageous application in the formation of artificial fish baits; and, consequently, it is in this particular environment that the invention is described by way of example and not by way of limitation.

Thus, referring to FIG. 1, there has been illustrated a simulated, spherically-shaped fish egg 20 which, for purposes of example only, might be identical to a salmon egg in terms of known appearance and/or sensory characteristics. Thus, the egg 20 can, as will hereinbelow be described, be identical in color to a natural salmon egg; or, it could be dark-red in color; or, for that matter, it could be black or any other desired color dependent only upon the dyes or vegetable coloring materials added to the solution from which it is formed. In FIG. 2, the simulated egg (here indicated at 20') is tear-drop shaped in configuration, having a tail 21 which, although not present in natural salmon eggs or the like, can produce decided advantages when used as a bait since the tail 21 serves to impart non-linear movement of the egg 20 when engaged with a fish hook and positioned in a relatively moving water environment. Referring to FIGS. 3 and 4, there have been respectively illustrated an artificial or simulated worm 22 and maggot 24, both of which can be readily formed in accordance with the present invention and can be colored so as to be indistinguishable from natural worms or maggots. And, in FIG. 5, there has been illustrated an egg cluster, generally indicated at 25, which is for all intents and purposes indistinguishable from real or natural fish egg clusters; the simulated cluster 25 here comprising a plurality of simulated fish eggs 20 of the type shown in FIG. 1 supported in a semi-solid gel matrix 26 which is preferably transparent or transluscent and of a different shade or tint than the simulated eggs 20 so that the latter are clearly visible.

In carrying out the present invention, simulated products such as the exemplary simulated fish baits illustrated in FIGS. 1 through 5, are formed by first preparing a batter having predetermined, preselected ingredients and characteristics which vary dependent upon the nature of the product and its intended usage. Specific Examples of such exemplary batters will herein be later described in detail. Initially, however, those skilled in the art will appreciate that the only essential ingredients of the batter are: i) water; ii) a gellable ingredient preferably comprising a soluble alginate—for example, an alginate of the type described in the aforesaid Steiner, Gibsen, Freedman and Miller et al patents—and iii), if desired, one or more other optional ingredients such as: coloring agents; flavors or similar sensory attractants; comminuted food stuffs such as meat, fish or cereal products; etc. However, in accordance with the invention, the batter 32 preferably includes either a suitable sterilant or a sterilant neutralizing agent dependent upon the end use for which the product is intended.

Referring, for example, to FIGS. 6 and 7 conjointly, it will be noted that a rather rudimentary, but effective, system has been provided for forming simulated products—e.g, fish eggs or the like—which are generally spherical in configuration. Thus, in this form of the invention, the illustrative apparatus includes a vat or container 28 having a perforate bottom wall 29 with the perforate bottom wall of container 28 being disposed above a setting bath 30 in a second container 31. As best illustrated in FIG. 7, the batter 32 disposed within container 28 is permitted to drip through the openings 34 formed in the perforate bottom 29, with the droplets 35 thus formed falling into the setting bath 30. As was the case with the batter 32, the constituent ingredients of the setting bath 30 may be varied dependent upon the end use desired, but such ingredients will preferably include an aqueous solution of water and a metal salt; preferably, a calcium salt such as calcium carbonate ($CaCO_3$) or calcium chloride ($CaCl_2$). Again, in carrying out the invention, the other of the sterilant or sterilant neutralizing agent—i.e., the one not included in the batter 32—is included within the setting bath 30.

For example, assuming that the system operator desires to form simulated fish eggs of the type illustrated in FIG. 1 for use as a fish bait, the batter 32 would include: water; a water soluble alginate—e.g., sodium alginate—in a dilute aqueous solution with the alginate ranging from about 0.5% to about 2.0% by weight of the total water content and, preferably, being on the order of about 1.0%; optional additives hereinafter described in detail such as coloring agents or other attractants; and, in this exemplary instance, a sterilant neutralizing agent which might preferably comprise ammonium carbonate $(NH_4)HCO_3.(NH_4)CO_2HN_2$ added to the batter in amounts ranging from 0.01% to 5.0%, the preferred range being about 0.10%. The particular proportions of the ingredients selected may vary considerably dependent upon the desired characteristics of the finished product; and, representative Examples of such ingredients and proportions will be hereinbelow set forth. Suffice it to say at this point that the water content is preferably selected such that the water-algin mixture is a somewhat viscous or syrupy aqueous solution. In this exemplary case, the setting bath 30 is preferably an aqueous solution of water and calcium chloride—viz., a very dilute solution containing not more than 2.0%, at least 0.1%, and preferably about 0.2% calcium chloride. A suitable sterilant neutralizing agent or protein hardening agent such, for example, as formaldehyde ($CH_2O$), paraformaldehyde [$(CH_2O)_n$], glutaraldehyde ($C_5H_8O_2$) or other hardening sterilant, is added to the aqueous solution, preferably in a dilute amount such as on the order of 0.1%, or less, of formaldehyde.

Under these conditions, the viscous aqueous solution or batter 32 forms globules or droplets 35 which exit from container 28 through the openings 34 in the perforate bottom 29 thereof and which drop towards, and into, the dilute aqueous calcium chloride setting bath 30. As indicated diagrammatically in FIG. 7, it will be noted that the droplets 35, when initially formed, tend to be somewhat elongate in shape due to the surface attraction between the batter and the defining walls of the openings 34 in the perforate bottom 29. However, as each droplet 35 moves towards the batter 30, the surface tension of the liquid contained therein tends to cause the droplets 35 to assume a spherical shape; and, when the droplet enters the setting bath 30, the interaction between the dilute calcium chloride solution and the algin in the batter serves to "set" the droplet, substantially instantaneously, in the particular shape and configuration that it occupied when first introduced into the bath 30. Moreover, the formaldehyde or other protein hardening sterilant contained in the setting bath serves to not only sterilize and preserve the materials defining the simulated egg but, also, to form a tough outer skin on the egg which greatly facilitates engagement of the egg with a fish hook and almost exactly duplicates the physical features of a salmon egg or the like. At the same time that the formaldehyde tends to saturate the egg and form the thickened skin thereon, the ammonium carbonate contained within the batter serves to slowly release ammonia which neutralizes the sterilant and protein hardening agent, thereby maintaining a relatively soft gelatinous center within the egg, again duplicating almost exactly the physical characteristics of a salmon egg or the like.

While the rudimentary system illustrated in FIGS. 6 and 7 is shown as a "batch-type" system, those skilled in the art will appreciate that it can be readily adapted for continuous operation by providing any conventional supply system for delivering batter to container 28. Similarly, container 28 could, if desired, be enclosed and pressurized so as to extrude the batter through the openings 34.

Turning next to FIG. 8, there has been illustrated in diagrammatic form an exemplary automated system, generally indicated at 36, which has been found particularly suitable for forming either spheroid fish eggs 20 of the type shown in FIG. 1 or tear-drop shaped eggs 20' of the type shown in FIG. 2. In this exemplary apparatus, the system is provided with a mixing tank or chamber 38 and a second tank, indicated in phantom at 31, which is suitable for holding the setting bath (not shown, but a bath which could be essentially identical to the bath 30 previously described in connection with FIG. 7). As here shown, a suitable batter would be formulated in the mixing vat 38 and, to insure a thoroughly homogeneous mixture of any solid particles in the viscous alginate solution such, for example, as comminuted food products or the like, the vat is provided with an agitator 39 which may be driven from any suitable source such as motor 40. A suction or discharge tube 41 coupled to a conventional pump 42 is provided for continuously withdrawing the batter (not shown) from the mixing vat 38 and directing the batter through an adjustable control valve 44 to either a discharge manifold 45 disposed in or above container 31 and/or a return conduit 46 back into the mixing vat 38. Thus, the valve 44 may be selectively adjusted, either separately or in conjunction with control of the pump 42 (in those cases where a variable speed/variable capacity pump is employed), to permit a controlled amount of the batter to be delivered to the manifold 45.

In accordance with the present invention, provision is made for separating discrete droplets of the batter from a plurality of vertically oriented manifold outlet conduits 48–51. To accomplish this, and as best illustrated by reference to FIGS. 8 and 9 conjointly, it will be noted that the manifold outlet conduits 48–51 terminate in a horizontal plane. A driven disk-like element 52 having a plurality of radial pins 54 projecting outwardly from the periphery thereof is positioned to permit the pins 54 to pass immediately beneath the lower ends of the manifold discharge conduits 48–51. Disk 52 is rotationally driven in any suitable manner such, for example, as by a motor 55; and may be mounted by any conventional means (not shown) for rotation in a fixed horizontal plane relative to the manifold 45.

In operation, and as best illustrated by reference to FIGS. 9 and 10 conjointly, it will be noted that as the disk-like member 52 rotates, the radial pins serve to wipe across the lower ends of the manifold discharge conduits 48–51, thereby engaging the viscous batter 32 exiting from the lower ends of the conduits and forming irregularly shaped globules 56 on the pins 54. Thus, referring to FIG. 10, it will be observed that the irregularly shaped globule 56 carried by the pin 54 depicted in solid lines tends to be stretched about the leading edge of the pin and to elongate as the viscous material begins to drop from the pin. As the pin 54 moves (from right to left as viewed in FIG. 10) the weight of the viscous material tends to separate the globule 56 from the pin 54 and it begins to drop from the reference plane RP towards the setting bath (not shown) disposed beneath the pins 54. As the droplet moves away from the pins and towards the setting bath, the surface tension of the liquid contained in the droplet causes the droplet to progressively assume a more and more spherical shape.

Thus, assuming that the plane diagrammatically illustrated at $L_1$ represents the surface of the setting bath, it will be appreciated that the droplet would occupy a generally regular capsule-shaped configuration as it enters the setting bath and, consequently, the resultant product would be capsule-shaped as indicated at $56_a$. However, assuming the reference plane $L_2$ is coincident with the surface of the setting bath, it will be appreciated that the trailing or upper extremity of the droplet will begin to taper and, under these assumed conditions, the droplet would be "set" in the configuration indicated at $56_b$ upon entry into the bath—that is, it would be capsule-shaped, but one end of the capsule would have a smaller diameter than the other end. If the level of the setting bath is at the reference plane $L_3$, the droplet will have assumed a generally tear-drop shape as indicated at $56_c$, thereby producing an egg of the type shown at 20' in FIG. 2 upon entry into the setting bath. Finally, given sufficient space for liquid surface tension to cause the droplet to assume a spheroid shape as indicated at 56$_d$—i.e., where the level of the surface of the setting bath is at the plane L$_4$—then the resultant product will be a spherical egg of the type shown at 20 in FIG. 1.

Thus, in carrying out the present invention, it is possible to form simulated products ranging from capsule-shapes through tear-drop shapes to spheriod shapes simply by controlling the distance between the point of departure of the droplet 56 from the pin 54 and point of entry into the setting bath; a distance which can range from about twelve inches or less when forming teardrop shaped products (the actual distance will vary dependent upon the viscosity of the batter 32, the size of the egg, etc.) to distances of from about twelve to fourteen inches to about twenty-four inches when forming spheriod shaped products.

In accordance with another of the important aspects of the present invention, provision is made for forming elongated semi-solid gelatinous products which can take the forms shown in FIGS. 3 and 4, for example; thereby simulating a worm (FIG. 3) or a maggot (FIG. 4). To accomplish this, the batter 32 would be formed in the manner previously described in connection with FIG. 8 and delivered via an adjustable control valve of the type shown at 44 in FIG. 8 to a manifold or discharge conduit 48 which, as best illustrated in FIG. 11, is coupled to an extrusion head 58 having a plurality of extrusion nozzles 59–62 formed therein. A driven shaft 60 mounted in suitable bearings (not shown) and driven by a motor 61 extends horizontally across the extrusion head 58 and is provided with a pair of axially spaced blades or knife surfaces 62, 64 positioned to sweep across the tips of the extrusion nozzles 59–62.

In carrying out this aspect of the invention, the extrusion head 58 is preferably mounted beneath the surface of the setting bath 30, as best illustrated in FIG. 12; thereby insuring that the batter 32 exiting from the extrusion nozzles is "set" immediately upon exiting the nozzles and interacting with the setting bath—although those skilled in the art will appreciate that the extrusion head 58 could be located slightly above the surface of the bath 30 but in sufficient proximity thereto that the batter exiting from the extrusion nozzle forms a continuous strand entering the bath. As a consequence of the preferred arrangement, an elongate product having an elongate soft gelatinous core and a thickened outer casing is continuously formed at the exit of each extrusion nozzle. By controlling the speed of rotation of shaft 60 and, therefore, of the knives 62, 64, a plurality of relatively long worm-like objects of the type shown at 22 in FIG. 3 can be formed; or, alternatively, a plurality of short maggot-like products of the type shown at 24 in FIG. 4 can be formed. Of course, where the extrusion head 58 is located above the surface of bath 30, it would be preferable to provide means (not shown) for cutting the "set" strands of batter after entry into the bath.

In order to form an egg cluster of the type generally indicated at 25 in FIG. 5, a somewhat modified form of apparatus can be employed. Thus, referring to FIGS. 13 and 14, it will be noted that a cluster forming system, generally indicated at 65, is provided which is substantially identical to the system diagrammatically shown in FIG. 8; except, that in this instance, the batter delivered to manifold 45 is deposited in a rotating tray 66 located above the surface of the setting bath 30 and having at least one enlarged opening 68 formed therein. In this case, the batter formed in mixing chamber 38 would preferably be somewhat transluscent or transparent in color and a plurality of simulated fish eggs—for example, a plurality of the eggs formed in the system shown in FIGS. 6 and 7—is thoroughly dispersed throughout the batter contained within mixing chamber 38. Prior to such dispersion, the previously formed simulated eggs are thoroughly rinsed to remove all traces of formaldehyde or other protein hardening agent. The thus mixed batter containing a plurality of simulated fish eggs is then deposited in rotating tray 66. As the tray 66 collects the batter, agglomerations thereof, generally indicated at 69 in FIG. 14, tend to drop through the opening 68 and fall into the setting bath 30. Thus, the exemplary system readily permits a plurality of simulated eggs to be agglomerated in a secondary algin-based batter which is then introduced into the setting bath in distinct agglomerations to form egg clusters of the type generally indicated at 25 in FIG. 5.

It is, of course, also within the scope of the invention to extrude a continuous stream of the thus formed batter into the setting bath—for example, with the use of a screw-type auger or the like (not shown), or by simply locating the exit end of manifold conduit 45 directly in the bath—or, alternatively, the tray 66 could be imperforate and the gelatinous agglomeration of the previously simulated eggs and the secondary batter could simply be immersed in the setting bath 30. In any of the foregoing arrangements either a relatively long or a relatively large cluster is formed which can thereafter be subdivided by cutting to form small individual clusters of a desired size and/or shape.

Thus far, the invention has been described principally in conjunction with methods and apparatus for forming simulated fish baits of various shapes. However, as previously indicated, the invention is not so limited. Thus, where one wished to form a simulated or artificial food product suitable for either animal or human consumption, it would merely be necessary to take the proper steps to insure that the resultant product is sterile and fit for human and/or animal consumption, preferably using other than formaldehyde and similar protein hardening agents. For example, various types of materials can be employed which tend to release sulfur dioxide ($SO_2$) which serves as an excellent sterilant to prevent bacteriological growth and attack of conventional food stuffs. Thus, if the product 20 illustrated in FIG. 1 were to comprise an edible fish egg—for example, a salmon egg of the type commonly used as an edible food product by many persons throughout the world; or caviar—it would merely be necessary to introduce the sterilant into the batter 32 and to provide a sterilant neutralizing agent in the setting bath 30.

For example, excellent results have been obtained when utilizing sodium metabisulfite ($Na_2S_2O_5$) as a sterilant in sufficiently excessive amounts to guarantee thorough sterilization upon release of $SO_2$. It has been found that satisfactory amounts of sodium metabisulfite are generally in the range of from 0.0005% to 2.0% by weight; but the preferred range is from 0.002% to 0.01% by weight.

Moreover, it has further been found that the addition of an edible acid such as citric acid ($C_6H_8O_7.H_2O$), phosphoric acid ($H_3PO_4$), hydrochloric acid (HCL), or sulfuric acid ($H_2SO_4$) to the batter 32 in sufficient quantity to react with the sodium metabisulfite or other $SO_2$ producing salt serves to insure a slow, gradual, release of sulfur dioxide and complete evolution thereof within the interior of the products thus formed. The sulfur dioxide tends to migrate from the inner portions of the products towards the exterior and could, absent the use of a suitable neutralizing agent, leave hazardous residues and produce noxious fumes harmful to both man and animals. However, in carrying out this aspect of the present invention, it is preferable to use a setting bath 30 which includes calcium carbonate ($CaCO_3$) rather than calcium chloride ($CaCl_2$). In such a system, the calcium carbonate, just as the calcium chloride, tends to release calcium ions in solution which serves to "set" the algin in the batter 32. At the same time, the calcium carbonate interacts with the sulfur dioxide to neutralize the same and eliminate harmful residues and noxious odors. In such an arrangement, the calcium carbonate ($CaCO_3$) is preferably added to water to form an aqueous solution containing on the order of 12.0% calcium carbonate by weight; whereas the sodium metabisulfite ($Na_2S_2O_5$) is preferably added in trace amounts ranging from about 0.5% to about 1.0% by weight.

Figure 14:
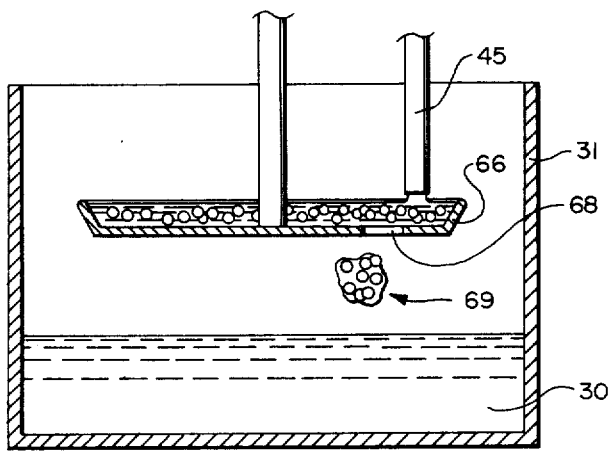

When forming edible products of the foregoing character, it is simply necessary to add optional ingredients to the batter 32 such, for example, as meat, fish and/or cereal products, meat or fish by-products, meat or fish offal, other proteinaceous materials and/or nutrients, vitamin supplements, etc., with the particular selection of additives being optional and dependent upon the nature of the product being produced. A system such as shown in FIG. 13 or 14, or a screw-type auger delivery system would, for example, be satisfactory for forming edible pet food kibbles or the like; whereas the system of FIG. 8 would be satisfactory for forming edible caviar or the like.

It should be noted that in those instances where formaldehyde or other protein hardening agents are employed, it has been found to be particularly desirable to thoroughly rinse the simulated products formed prior to packaging. Thus, when forming egg clusters, the simulated eggs formed initially would preferably be thoroughly rinsed prior to introduction into the secondary batter so as to remove all residues therefrom.

The following Examples will be helpful in determining the scope and versatility of the present invention. In general, however, it should be understood that the proportions given of optional ingredients are not critical, may vary over wide ranges, and, while important insofar as any particular simulated product is concerned, are simply matters of choice dependent upon the desired characteristics of the final simulated product. In each Example, unless otherwise stated, the dry ingredients were mixed dry and then added to water or other liquids at room temperature. The processes were all carried out at room temperature, and no heating or cooling of the ingredients was required at any stage prior to packaging.

EXAMPLE I—DOG FOOD

In order to prepare a simulated dog food, a batter was first prepared comprising the following ingredients in the following proportions:

| | |
|---|---|
| (a) meat products (including offal and/or meat by-products) | 30.5% |
| (b) cereal (preferably gelatinized) | 46.0% |
| (c) fats, oils | 22.0% |
| (d) algin [$(C_6H_8O_6)_n$] | 1.0% |
| (e) sodium metabisulfite ($Na_2S_2O_5$) | 0.5% |
| | 100.0% |

An equal quantity of water—i.e., the algin represented 1% by weight of the overall quantity of water added—was added to the batter and the batter was thoroughly mixed. The batter was then discharged in discrete quantities into a setting bath comprising an aqueous solution of water containing 12% by weight of calcium carbonate powder. Sodium metabisulfite ($Na_2S_2O_5$) was included in amounts sufficiently excessive to guarantee thorough sterilization upon release of sulfur dioxide ($SO_2$). As previously stated, this range can vary from about 0.0005% to about 2.0% by weight; but, from about 0.002% to about 0.01% by weight is preferred. The particular products, cereals, fats and oils are all optional ingredients which provide desired nutrient and/or grooming values. It was found that the calcium carbonate served a dual purpose in forming the dog food described above—viz., it served to "set" the algin gel in the desired shape and, at the same time, it served as a barrier layer to prevent escape of any free sulfur dioxide ($SO_2$) by neutralizing the sulfur dioxide. Because of the gelatinous nature of the product, all free sulfur dioxide eventually perfuses to the exterior of the shaped product and, hence, it was all eventually neutralized. Assuming that the remaining biological matter in the product is not recontaminated, it then remains in a state of preservation, thereby significantly reducing packaging costs and eliminating the need for refrigeration. The equipment used to discharge the batter into the setting bath here took the form of apparatus of discharging a continuous batter strand directly into the setting bath; and, the "set" product was thereafter cut up to form kibbles.

EXAMPLE II—CAT FOOD

Again employing the same process and equipment described in connection with Example I, a simulated cat food was prepared in accordance with the invention using the following ingredients in the indicated proportions:

| | |
|---|---|
| (a) Fish (offal and fish by-products) | 15.0% |
| (b) Poultry (offal and poultry by-products) | 15.0% |
| (c) Liver, liver scraps | 5.0% |
| (d) Eggs | 1.0% |
| (e) Cereal (gelatinized) | 40.0% |
| (f) Fats, oils | 22.0% |
| (g) Algin [$(C_6H_8O_6)_n$] | 1.5% |
| (h) Sodium metabisulfite ($Na_2S_2O_5$) | 0.5% |
| | 100.0% |

The foregoing ingredients were mixed with water, as required, and processed in the same fashion as the dog food of Example I to form an edible cat foot.

EXAMPLE III—COTTAGE CHEESE

The process and equipment described in Example I were used to form solidified milk—e.g., cottage cheese. To accomplish this, 1.0% of algin [$(C_6H_8O_6)_n$] was first thoroughly mixed with 99% by weight of whole milk. Thereafter, an aqueous solution of sodium metabisulfite ($Na_2S_2O_5$) and citric acid ($C_6H_8O_7.H_2O$) was formed comprising 75.0% sodium metabisulfite by weight and 25.0% citric acid by weight, with water as required. The sodium metabisulfite/citric acid solution was then added to the milk/algin solution in a ratio of 1,500 PPM to form a viscous batter. The resulting batter was then dropped into an aqueous solution containing equal parts of calcium carbonate and calcium chloride in dilute solution—approximately 2.0% by weight, although satisfactory results were achieved using solutions ranging from about 0.5% to about 5.0% by weight of the calcium carbonate/calcium chloride mixture—to form the finished product.

EXAMPLE IV—CAVIAR

The method used in Example I was used to prepare artificial caviar—in this case using the equipment of FIG. 8. To this end, the following ingredients in the following proportions were mixed to form a batter such as the batter 32 heretofore described:

| (a) | Algin [$(C_6H_8O_6)_n$] | 2.000% |
|---|---|---|
| (b) | 2,3-Butanedione ($C_4H_6O_2$) | .001% |
| (c) | Trimethylamine ($C_3H_9N$) | .009% |
| (d) | Salt (NaCl) | 2.990% |
| (e) | Fish juice | 91.0% |
| (f) | Fish oil | 3.000% |
| (g) | Sodium metabisulfite ($Na_2S_2O_5$) | 1.000% |
| | | 100.00% |

Water and coloring were added as required. The resulting product was, for all practical purposes, indistinguishable from natural caviar in terms of olfactory, gustatory and other sensory characteristics. The 2,3-Butanedione and Trimethylamine added the proper character to the product in terms of odor and taste, while the salt provided taste and served to stabilize the product.

EXAMPLE V—FISH BAIT

The process of Example I and the equipment of FIG. 8 were next used to form artifical salmon eggs intended for usage as fish bait. To accomplish this, a batter was formed using the following ingredients in the following proportions:

| (a) | Algin [$(C_6H_8O_6)_n$] | 4.0% |
|---|---|---|
| (b) | Corn, homogenized | 79.9% |
| (c) | Sugar (corn syrup) | 10.00% |
| (d) | Cod liver oil | 6.00% |
| (e) | Ammonium carbonate ($NH_4$)$HCO_3$.($NH_4$)$CO_2HN_2$ | 0.1% |
| | | 100.00% |

In this case, no sodium metabisulfite was utilized but, rather, the setting bath comprised an aqueous solution containing approximately 0.2% by weight calcium chloride and 0.1% by weight formaldehyde. Artificial salmon eggs were formed which were spherical in shape as depicted in FIG. 1 and which were indistinguishable from real salmon eggs. Similarly, artifical salmon eggs were also formed which were identical in composition but which were tear-drop shaped as depicted in FIG. 2. In both cases, it was found that the formaldehyde in the setting bath served to form a thickened toughened skin on the outer surface of the egg, while the ammonium carbonate contained within the batter tended to neutralize the formaldehyde and thus maintain the core of the egg in a relatively soft gelatinous form. As a consequence, the spherical egg was indistinguishable from a natural salmon egg, while the tear-drop shaped egg differed from the natural salmon egg only in that the egg included a tail 21 (FIG. 2).

SUMMARY

While the present invention has been described in connection with various exemplary materials and solutions, those skilled in the art will readily appreciate that numerous modifications may be made without departing from the spirit of the invention as expressed in the appended claims. For example, while the formation of various types of fish baits have herein been described utilizing a setting bath having formaldehyde or a similar protein hardening material in aqueous solution with the setting agent, those skilled in the art will readily appreciate that the formaldehyde need not be placed in solution in the setting bath but, rather, could be applied to the simulated products by subsequent spray techniques or in a subsequent dip. In either case, however, it is desirable to thoroughly rinse the product once the formaldehyde has formed the toughened outer skin.

Moreover, when the present invention is used to form artificial fish baits, it is desirable to include in the batter any of various well known conventional fish attractants. These might include, for example, Rhodinol (rose oil), anise, fish oils, fish juices, menthol, and similar materials characterized by their attractive qualities to fish and which will tend to slowly "milk" out of the fish bait during use; thus providing either or both of an olfactory or gustatory stimulous for enticing fish. Indeed, where such attractants include fats, oils and the like, as they "milk" out of the gelled algin substance—which here serves both (i) as a support matrix to hold such attractants (and other materials), and (ii) as a release retardant to permit gradual "milking" of the attractants—they tend to form a shiny, oily surface on the egg essentially duplicating the appearance of natural eggs and the like. Moreover, while such oils are not soluble in water, they do tend to form a "halo" or "aura" around the bait when in use which is believed to be in itself an attractant for certain species of fish.

I claim as my invention:

1. The method of forming a shaped edible product comprising the steps of:
    (a) forming a first aqueous solution including at least water and algin;
    (b) forming a second aqueous solution including at least water and a metal salt dissolved therein;
    (c) introducing a sterilant into one of the first and second aqueous solutions;
    (d) introducing a sterilant neutralizing agent into the other of the first and second aqueous solutions; and,
    (e) depositing a discrete quantity of the first solution into the second solution whereupon
        (i) the interaction between the algin in the first solution and the metal ions released by the metal salt in the second solution serves to set the constituent ingredients of the first solution in the particular shape occupied thereby upon introduction into the second solution,
        (ii) the sterilant serves to sterilize the constituent ingredients of the product thus formed,
        and (iii) the neutralizing agent serves to slowly neutralize the sterilant.

2. The product produced by the method set forth in claim 1.

3. The method set forth in claim 1 further characterized in that the discrete quantity of the first solution is deposited into the second solution during step (e) by forming discrete globules of the first solution at a point disposed above the surface of the second solution and permitting the globules to drop from the point of formation thereof into the second solution wherein the globules are set substantially instantaneously in the shaped configuration occupied at the time of entry into the second solution as a result of the algin/metal ion interaction.

4. The method set forth in claim 3 further characterized in that the discrete globules are formed in relatively close proximity to the surface of the second solution so that such globules retain a generally elongate capsule shape at the point of entry into the second solution.

5. The method set forth in claim 3 further characterized in that the discrete globules are formed at a sufficient distance above the second solution such that liquid surface tension causes the globules to assume a generally tear-drop shaped configuration at the point of entry into the second solution.

6. The method set forth in claim 5 wherein the product produced is a simulated tear-drop shaped fish egg suitable for bait.

7. The method set forth in claim 3 further characterized in that the discrete globules are formed at a sufficient distance above the second solution such that liquid surface tension causes the globules to assume a generally spheroid shaped configuration at the point of entry into the second solution.

8. The method as set forth in claim 7 wherein the product produced is simulated spherical shaped fish egg suitable for bait.

9. The method set forth in claim 1 further characterized in that the discrete quantity of the first solution is deposited into the second solution during step (e) by extrusion of discrete lengths of the first solution from an extrusion nozzle so that the first solution is set substantially instantaneously as it progressively exits the extrusion nozzle and enters the second solution.

10. The method as set forth in claim 9 further characterized in that the extrusion nozzle is disposed beneath the surface of the second solution.

11. The method set forth in claim 9 further characterized in that the first solution is, upon entry into and setting by the second solution, periodically severed to form simulated products having an elongate shape.

12. The method set forth in claim 11 wherein the set first solution is severed in lengths simulating a maggot.

13. The method set forth in claim 11 wherein the set first solution is severed in lengths simulating a worm.

14. The method set forth in claims 6, 8, 12 or 13 wherein the first solution contains a fish attractant which is dispersed throughout the set constituent ingredients and wherein the algin serves as a release retardant to permit controlled gradual release of the attractant over a period of time so as to permit the bait thus formed to continuously milk attractant when in use.

15. The method set forth in claims 6, 8, 12 or 13 wherein the second solution contains formaldehyde which serves to form a tough hardened external skin on the simulated baits produced.

16. The method set forth in claims 6, 8, 12 or 13 wherein the second solution contains formaldehyde which serves to form a tough hardened external skin on the simulated baits produced and the first solution contains ammonium carbonate which serves to neutralize the formaldehyde and thus maintain the interior portions of the baits in a soft gelatinous condition.

17. The method set forth in claims 1 or 3 wherein the algin is present in the first solution in a percentage by weight ranging from 0.5% to about 2.0% of the total water content thereof.

18. The method set forth in claims 1 or 3 wherein the algin is present in the first solution in a percentage by weight on the order of 1.0% of the total water content thereof.

19. The method as set forth in claims 1 or 3 wherein the metal salt dissolved in the second solution is calcium chloride.

20. The method set forth in claims 1 or 3 wherein the metal salt dissolved in the second solution is calcium chloride present in an amount ranging from at least about 0.1% to less than about 2.0% by weight of the total water content thereof.

21. The method set forth in claims 1 or 3 wherein the metal salt dissolved in the second solution is calcium chloride present in an amount on the order of 0.2% by weight of the total water content thereof.

22. The method for forming a synthetic edible product as set forth in claim 1 wherein the edible product is intended for at least one of animal consumption and/or human consumption, and wherein the sterilant comprises a material characterized by its ability to release $SO_2$ and is added to the first solution, and the sterilant neutralizing agent comprises the metal salt in the second solution which serves not only to solidify the constituent ingredients of the first solution upon introduction thereof into the second solution but, additionally, to neutralize the $SO_2$.

23. The method set forth in claim 22 further characterized in that the sterilant is sodium metabisulfite.

24. The method set forth in claims 22 or 23 further characterized in that the metal salt is calcium carbonate.

25. The method as set forth in claim 22 further characterized in that the sterilant is sodium metalbisulfite present in the first solution in an amount ranging from 500 PPM to 2.0%.

26. The method as set forth in claim 22 further characterized in that the sterilant is sodium metalbisulfite present in the first solution in an amount ranging from 2,000 PPM to 0.01%.

27. The method as set forth in claims 22, 25 or 26 further characterized in that the metal salt comprises on the order of 12% by weight of calcium carbonate in the second aqueous solution.

28. The method set forth in claim 22 wherein the product produced is a simulated pet food.

29. The method set forth in claim 28 wherein the product produced is simulated kibbled dog food.

30. The method set forth in claim 28 wherein the product produced is simulated kibbled cat food.

31. The method as set forth in claim 22 wherein the product produced is simulated caviar.

32. The method set forth in claim 22 wherein the product produced is a simulated salmon egg.

33. The method set forth in claim 22 wherein the product produced is simulated cottage cheese.

34. The method for forming a synthetic edible product as set forth in claim 1 wherein the edible product is intended for use as a bait to attract marine animals and wherein the sterilant comprises formaldehyde included in the second solution, and the sterilant neutralizing agent comprises ammonium carbonate added to the first solution whereby the shaped product formed in step (e) interacts with the formaldehyde in the second solution to form a relatively thick hardened outer sterilized skin surface thereon and the ammonium carbonate serves to neutralize the formaldehyde and to maintain the central portion of the shaped product in a relatively soft gelatinous form.

35. The method set forth in claim 34 wherein the edible product is shaped to simulate a fish egg.

36. The method set forth in claim 34 wherein the edible product is shaped to simulate a fish egg having a tear-drop shape.

37. The method as set forth in claim 34 wherein the edible product is shaped to simulate a maggot.

38. The method set forth in claim 34 wherein the edible product is shaped to simulate a worm.

* * * * *